United States Patent
Ye et al.

(10) Patent No.: US 11,519,724 B2
(45) Date of Patent: Dec. 6, 2022

(54) METHOD FOR MONITORING GROUND SETTLEMENT BASED ON COMPUTER VISION

(71) Applicant: Zhejiang University, Zhejiang (CN)

(72) Inventors: Xiaowei Ye, Hangzhou (CN); Tao Jin, Hangzhou (CN); Pengpeng Ang, Hangzhou (CN)

(73) Assignee: Zhejiang University, Hangzhou (CN)

( * ) Notice: Subject to any disclaimer, the term of this patent is extended or adjusted under 35 U.S.C. 154(b) by 407 days.

(21) Appl. No.: 16/918,350

(22) Filed: Jul. 1, 2020

(65) Prior Publication Data
US 2021/0010809 A1    Jan. 14, 2021

(30) Foreign Application Priority Data
Jul. 11, 2019 (CN) .......................... 201910623359.7

(51) Int. Cl.
G01C 15/00 (2006.01)
G01C 3/02 (2006.01)
G01C 5/00 (2006.01)
G01C 15/06 (2006.01)

(52) U.S. Cl.
CPC ............. *G01C 15/006* (2013.01); *G01C 3/02* (2013.01); *G01C 5/00* (2013.01); *G01C 15/06* (2013.01)

(58) Field of Classification Search
CPC .............................. G01C 15/006; G01C 15/06
USPC .................................................. 33/290–295
See application file for complete search history.

(56) References Cited

U.S. PATENT DOCUMENTS

| | | | | |
|---|---|---|---|---|
| 6,023,326 | A * | 2/2000 | Katayama | G01C 15/002 33/290 |
| 10,753,740 | B2 * | 8/2020 | Kotzur | G01C 15/008 |
| 10,895,632 | B2 * | 1/2021 | Ohtomo | G01S 7/4817 |
| 11,333,497 | B2 * | 5/2022 | Eisenreich | G01C 15/006 |
| 11,421,989 | B2 * | 8/2022 | Ohtomo | G01C 15/002 |
| 2022/0011577 | A1 * | 1/2022 | Lawver | G02B 27/0101 |
| 2022/0074764 | A1 * | 3/2022 | Müller | G06T 7/70 |

FOREIGN PATENT DOCUMENTS

CN    102589523 A    7/2012

OTHER PUBLICATIONS

Chinese Office Action; Application No. 201910623359.7; dated Apr. 9, 2020; 11 pages.

* cited by examiner

*Primary Examiner* — George B Bennett
(74) *Attorney, Agent, or Firm* — Conley Rose, P.C.; J. Robert Brown, Jr.

(57) ABSTRACT

Disclosed is a method for monitoring ground settlement based on computer vision. Before monitoring starts, the first image frame is captured. For one measuring point, the area of the top LED lamp is defined as a tracking template, its pixel center is the reference point for settlement calculation, and a monitoring area is defined by an estimated range. After monitoring starts, the best matched of the lamp template is searched for in the monitoring area of a second image frame. When the best matched area is obtained, its pixel center is obtained as the new lamp position, and it is selected as the new template; the pixel displacement between two adjacent image frames can be obtained by comparison. The total pixel displacement of multiple points during the monitoring period is calculated through the accumulated displacement, and the actual settlement is calculated through a pixel-physical ratio.

1 Claim, 2 Drawing Sheets

METHOD FOR MONITORING GROUND SETTLEMENT BASED ON COMPUTER VISION

CROSS-REFERENCE TO RELATED APPLICATIONS

This application claims priority to Chinese Patent Application No. 201910623359.7 filed on Jul. 11, 2019, which is incorporated by reference herein as if reproduced in its entirety.

TECHNICAL FIELD

The present disclosure relates to an optical technology, computer vision technology and image processing technology, and in particular, to long-term on-line monitoring of ground settlement by using a camera.

BACKGROUND

With the continuous improvement of China's economic development, China has continuous underground construction to meet social needs. The underground construction, including subway shield tunnel construction and foundation pit excavation construction, inevitably causes soil disturbance and further leads to ground settlement, bringing potential safety hazards to surrounding buildings, pipelines, and roads. Therefore, timely monitoring of the surface around an underground construction site helps to learn about the law and degree of settlement, adjust construction parameters in time, and reduce the impact of underground construction on the surrounding environment.

Ground settlement monitoring is very important during underground construction, but how to implement efficient, timely, accurate, and low-cost settlement monitoring is still a major challenge. Current settlement monitoring methods mainly include the following.

Settlement monitoring by using a digital level. This method is currently most commonly used. By setting up a level at a control point, the elevation of a measured point is measured, and the settlement of each measured point is obtained through the difference between elevations measured twice. However, this method requires manual erection of a level and a leveling rod, so the monitoring frequency is greatly limited and it is difficult to carry out observation. In addition, there is a certain error in erecting the level and the leveling rod each time.

Settlement monitoring by using a fiber Bragg grating hydrostatic level. In this method, a reference point and a measured point are selected, and a hydrostatic level is installed at each point and connected with a breather pipe through a liquid pipe; the rise and fall of a float resulting from the change of the water level is sensed by a fiber Bragg grating connected to the float in a barrel, and the settlement change of the measured point is measured through the height difference of the liquid level at each measured point. The method can realize all-weather on-line monitoring, but the level between the measured points needs to be connected through the breather pipe and the liquid pipe, which is easily affected by surrounding pedestrians and vehicles. Meanwhile, a fiber Bragg grating demodulator is high in cost.

Global Positioning System (GPS)-based settlement monitoring. In this method, a GPS receiver is installed at each measured point, signals from multiple satellites are received by the receivers, and a distance is calculated to perform positioning. However, GPS signals are easily blocked by tall buildings and other objects, affected by electromagnetic interference and bad weather, and the price of a single receiver is relatively high, making it difficult to carry out multi-point monitoring.

Settlement monitoring by using a total station. In this method, prisms are installed at each measured point, and scanned one by one through the total station to obtain the settlement change of each measured point. In this method, monitoring points need to be scanned one by one, and the monitoring frequency is limited. The total station that can scan automatically is high in cost, and the total station that cannot scan automatically has little advantage over the level.

The above methods each have shortcomings and cannot be used to effectively implement long-term, high-precision, and low-cost monitoring of ground settlement under a complex urban environment. How to implement rapid-layout, low-cost, high-precision, and long-term on-line monitoring around an underground construction area has become a difficult problem to be resolved by researchers and engineers in related fields.

SUMMARY

The present disclosure provides a method for monitoring ground settlement based on computer vision to overcome the shortcomings of existing settlement monitoring methods in aspects of cost, precision, monitoring frequency, and monitoring duration. In this method, an optical lens, an image sensor, and a digital image processing technology are utilized to perform multi-point monitoring of ground settlement of a target area. A measuring device includes a monitoring target, an industrial camera, a zoom lens, a computer, and a connecting cable. The present disclosure allows for:

(1) Fast on-site arrangement of a settlement monitoring device. As the on-site monitoring needs are flexible and changeable, the steps of layout of the settlement monitoring device should be simplified and the layout speed should be improved to adapt to the ever-changing monitoring needs and to timely monitor the settlement of potential areas.

(2) Multi-point monitoring of ground settlement by a camera. By increasing the measurement points of a single camera, the number of cameras arranged can be reduced, thus lowering the cost, reducing the complexity of a system, and further improving the arrangement speed.

(3) All-weather online monitoring. The continuity of ground settlement changes requires that the monitoring device can monitor the settlement status in real time in all weather, so as to fully grasp the law of ground settlement changes and ensure that the whole process of settlement evolution and development can be monitored.

The method for monitoring ground settlement based on computer vision according to the present disclosure includes the following specific implementation steps:

Step A: Instrument Arrangement

Step A1: investigating ground conditions of a to-be-measured area, comprehensively considering soil texture and pavement, surrounding roads, vegetation conditions and corresponding monitoring requirements, and selecting appropriate ground monitoring points;

Step A2: inserting monitoring targets into a ground at to-be-measured ground monitoring points to ensure that the monitoring targets are firmly installed and free from looseness and inclination, where each monitoring target is composed of a top Light-Emitting Diode (LED) lamp, an LED lamp chamber, a rechargeable battery, an LED lamp switch, and a target rod;

Step A3: at an appropriate position on a midperpendicular of a connecting line of the ground monitoring points, arranging an industrial camera and installing a zoom lens, and connecting the industrial camera with a computer.

Step B: Device Debugging

Step B1: adjusting a tripod to ensure that a visual field of the industrial camera is in a horizontal position, ensuring that the tripod is firmly grounded, and tightening connecting screws;

Step B2: facing an open side of the LED lamp chamber to the lens, installing the rechargeable battery, and testing through the LED lamp switch whether the top LED lamp of the monitoring targets can emit light normally for each target LED lamp;

Step B3: adjusting a focal length and an aperture of the zoom lens, and an exposure value and a gain value of the industrial camera to ensure that an image of the top LED lamps in the visual field of the industrial camera is clearly visible.

Step C: Parameter Setting

Step C1: acquiring a first image frame, circling the top LED lamp as a tracking template in the first image frame, estimating a total amount of possible settlement generated by each ground monitoring point during monitoring, and assigning a monitoring area for each top LED lamp;

Step C2: measuring a distance between centers of the two target rods, and calculating a proportional relation between a pixel size on the image and a physical size in the real world;

Step C3: setting a sampling frequency and a data storage path.

Step D: Monitoring and Result Storage

Step D1: before formal monitoring is started, checking for the last time whether the image of the top LED lamp is clear and whether a camera exposure, gain, and storage path are correct;

Step D2: starting to monitor and checking by naked eye whether monitoring results are reasonable and whether there are sawtooth waves or abnormal settlement results that are excessively large or excessively small, and if the monitoring results are incorrect, repeating step D1;

Step D3: after the monitoring results are verified to be correct, continuing the monitoring until the end of the monitoring period, and storing the settlement monitoring result.

In the foregoing steps, a gigabit Ethernet cable is adopted for transmission between the industrial camera and the computer to ensure that images captured by the industrial camera can be transmitted to the computer in time for processing.

The top of the monitoring target is the LED lamp chamber with an end open. The open side faces the camera lens. The inner wall of the LED lamp chamber is treated with black matte paint to reduce the influence of sunlight or other adjacent illumination sources.

The top LED lamp of the monitoring target is powered by the rechargeable battery. The rechargeable battery is installed inside the target rod. The working time is estimated according to the power of the top LED lamp and the rechargeable battery capacity. The rechargeable battery shall be replaced in time before being exhausted.

The calculation of a proportional relation between a pixel size on the image and a physical size in the real world should be carried out. The process of measuring a distance between centers of the two target rods in the real world is conducted by a hand-held laser range finder. In case of limited conditions, a measuring tape can also be used. The measured distance between two target rods should include the intervals of multiple monitoring targets to reduce the error.

The monitoring process is implemented using a template update matching algorithm. Before monitoring starts, the first image frame is captured. For one measuring point, the area of the top LED lamp in the first image frame is circled as a tracking template, the position of the pixel center of the template area is used as the reference point for calculating the settlement of the point, and a monitoring area of this point is circled according to an estimated settlement amount. After monitoring is started, the best match of the top LED lamp template is searched for in the corresponding monitoring area of the second image frame. When the best matched area of the template on the second image is obtained, the position of the pixel center of the best matched area is obtained as the new position of the top LED lamp, and the best matched area is selected as the new template. Thus, the pixel displacement between the two adjacent image frames is obtained, and by analogy, multiple pixel displacements of the top LED lamp templates in two adjacent image frames are continuously calculated. The total pixel displacements of the top LED lamps during the monitoring period are calculated through the accumulation of adjacent pixel displacement values, and the actual settlement of the top LED lamps are calculated through the proportional relation between a pixel size on the image and a physical size in the real world.

Compared with the prior art, this technology has the following advantages.

(1) Target installation is fast and efficient, with high extensibility and flexibility. Long-term on-site monitoring can be realized by a replacing the internal rechargeable battery.

(2) The settlement of multiple measured points can be simultaneously monitored through one camera, thus improving the time synchronization of settlement monitoring at measured points.

(3) By adopting template update matching and matte treatment of the inner wall of the LED lamp chamber of the target, the interference of environmental light sources including sunlight can be effectively reduced, and the robustness of the system can be improved.

(4) The sampling frequency of the system can be adjusted by selecting the appropriate industrial camera and parameters, which has wide adaptability to scenes.

(5) This method features low instrument and equipment cost, rapid arrangement, high accuracy, little impact on the site environment, and high reusability.

Figure 1:
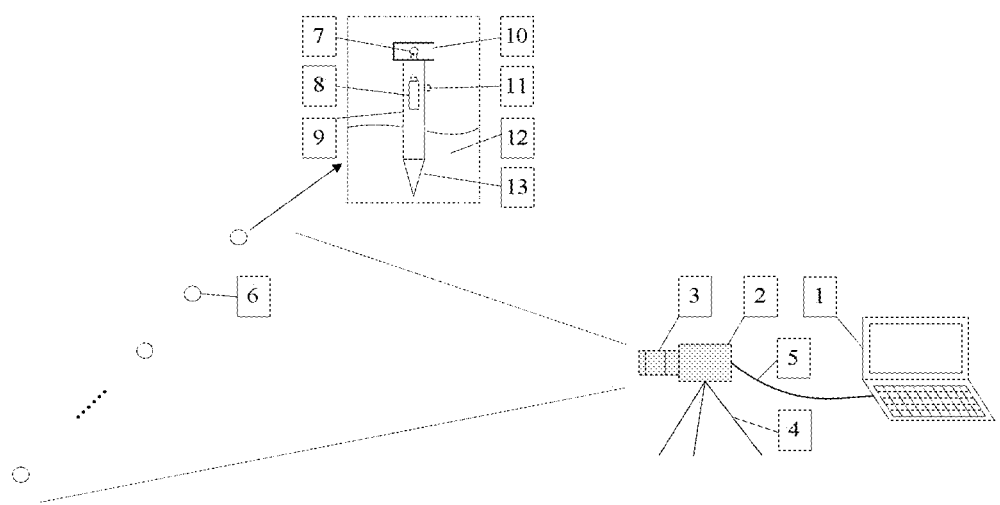
FIG. 1 is a schematic diagram of a device for a method according to the present disclosure.
Figure 2:
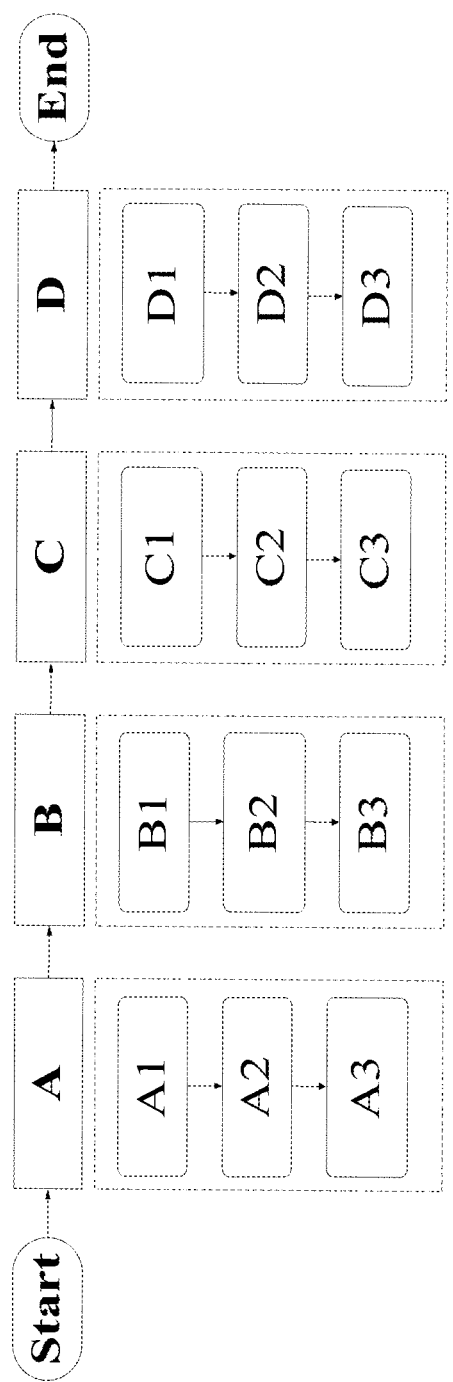
FIG. 2 is a monitoring flow chart of a method according to the present disclosure.

The various reference numerals in FIG. 1 respectively indicate:

1—computer; 2—industrial camera; 3—zoom lens; 4—tripod; 5—gigabit Ethernet cable; 6—ground monitoring point; 7—top LED lamp; 8—rechargeable battery; 9—target rod; 10—LED lamp chamber with an open side at the top of the target; 11—LED lamp switch; 12—ground; and 13—monitoring target The various reference numerals in FIG. 2 respectively indicate:

A: Instrument arrangement

B: Device debugging

C: Parameter setting

A1: Investigate and select ground monitoring points in a to-be-measured area of a ground surface A2: Insert monitoring targets at the to-be-measured ground monitoring points A3: Arrange an industrial camera at an appropriate position and connect it with a computer B1: Adjust a tripod so that the visual field of the camera is in a horizontal position B2: Face the open side of the LED lamp chamber to the zoom lens of the camera, install battery, and test whether the top LED lamps can emit light normally B3: Adjust the zoom lens and camera to measure that an image of the target is clearly visible in the visual field C1: Select the top LED lamp as a tracking template, estimate the amount of possible settlement generated during monitoring, and assign a monitoring area C2: Measure distance between centers of target rods and calculate a proportional relation between a pixel size and an actual size C3: Set a sampling frequency and a data storage path D1: Verify whether the image of the top LED lamp is clear and whether the camera exposure, gain, and storage path are correct D2: Observe the monitoring results and check the rationality of them D3: Store the settlement monitoring result

DETAILED DESCRIPTION

The implementation process of the present disclosure is described in detail with reference to the scenario shown in FIG. 1 and a monitoring flow shown in FIG. 2.

Referring to FIG. 1 and FIG. 2, the example given in the present disclosure is a process for monitoring the ground settlement of an area by using an industrial camera, a computer and corresponding targets. The specific implementation steps are as follows.

Step A: Instrument Arrangement

Step A1: Investigate ground conditions of a to-be-measured area, comprehensively consider soil texture and pavement, surrounding roads, vegetation conditions and corresponding monitoring requirements, and select appropriate ground monitoring points 6.

Step A2: Insert monitoring targets 13 into a ground 12 at to-be-measured ground monitoring points 6 to ensure that the monitoring targets 13 are firmly installed and free from looseness and inclination, where each monitoring target 13 is composed of a top LED lamp 7, an LED lamp chamber 10, a rechargeable battery 8, an LED lamp switch 11, and a target rod 9.

Step A3: At an appropriate position on a midperpendicular of a connecting line of the ground monitoring points 6, arrange an industrial camera 2 and install a zoom lens 3, and connect the industrial camera 2 with a computer 1.

Step B: Device Debugging

Step B1: Adjust a tripod 4 to ensure that a visual field of the industrial camera 2 is in a horizontal position and ensure that the tripod 4 is firmly grounded, and tighten connecting screws.

Step B2: Face an open side of the LED lamp chamber 10 to the zoom lens 3, install the rechargeable battery 8, and test through the LED lamp switch 11 whether the top LED lamp 7 of the monitoring targets 13 can emit light normally for each top LED lamp 7.

Step B3: Adjust a focal length and an aperture of the zoom lens 3, and adjust an exposure value and a gain value of the industrial camera 2 to ensure that an image of the top LED lamps 7 in the visual field of the industrial camera 2 is clearly visible.

Step C: Parameter Setting

Step C1: Acquire a first image frame, circle the top LED lamp 7 as a tracking template in the first image frame, estimate a total amount of possible settlement generated by each ground monitoring point 6 during monitoring, and assign a monitoring area for each top LED lamp 7.

Step C2: Measure a distance between centers of the two target rods 9, and calculate a proportional relation between a pixel size on the image and a physical size in the real world.

Step C3: Set a sampling frequency and a data storage path.

Step D: Monitoring and Result Storage

Step D1: Before formal monitoring is started, check for the last time whether the image of the top LED lamp 7 is clear and whether a camera exposure, gain, and storage path are correct.

Step D2: Start to monitor and check by naked eye whether monitoring results are reasonable and whether there are sawtooth waves or abnormal settlement results that are excessively large or excessively small, and if the monitoring results are incorrect, repeat step D1.

Step D3: After the monitoring results are verified to be correct, continue the monitoring until the end of the monitoring period, and store the settlement monitoring result.

In the foregoing steps, a gigabit Ethernet cable 5 is adopted for transmission between the industrial camera 2 and the computer 1 to ensure that images captured by the industrial camera 2 can be transmitted to the computer 1 in time for processing.

The top of the monitoring target 13 is the LED lamp chamber 10 with an end open.

The open side faces the camera zoom lens 3. The inner wall of the LED lamp chamber 10 is treated with black matte paint to reduce the influence of sunlight or other adjacent illumination sources.

The top LED lamp 7 of the monitoring target 13 is powered by the rechargeable battery 8. The rechargeable battery 8 is installed inside the target rod 9. The working time is estimated according to the power of the top LED lamp 7 and the capacity of the rechargeable battery 8. The rechargeable battery 8 shall be replaced in time before being exhausted.

The calculation of a proportional relation between a pixel size on the image and a physical size in the real world should be carried out. The process of measuring a distance between centers of the two target rods 9 in the real world is conducted by a hand-held laser range finder. In case of limited conditions, a measuring tape can also be used. In this case, the measured distance between two target rods 9 should include the intervals of multiple monitoring targets 13 to reduce the error.

The monitoring process is implemented using a template update matching algorithm. Before monitoring starts, the first image frame is captured. For one measuring point, the area of the top LED lamp 7 in the first image frame is circled as a tracking template, the position of the pixel center of the template area is used as the reference point for calculating the settlement of the point, and a monitoring area of this point is circled according to an estimated settlement amount. After monitoring is started, the best match of the top LED lamp 7 template is searched for in the corresponding monitoring area of a second image frame. When the best matched area of the template on the second image is obtained, the position of the pixel center of the best matched area is obtained as the new position of the top LED lamp 7, and the best matched area is selected as the new template. Thus, the pixel displacement between the two adjacent image frames is obtained, and by analogy, multiple pixel displacements of the top LED lamp templates in two adjacent image frames is continuously calculated. The total pixel displacements of the top LED lamps 7 during the monitoring period are calculated through the accumulation of adjacent pixel displacement values, and the actual settlement of the top LED lamps 7 in the real world is calculated through the proportional relation between a pixel size on the image and a physical size in the real world.

The content described in the examples of the specification is merely an enumeration of the implementations of the inventive concept, and the claimed scope of the present disclosure should not be construed as being limited to the specific forms stated in the examples. Equivalent technical means that come into the minds of those of skills in the art in accordance with the inventive concept also fall within the claimed scope of the present disclosure.

What is claimed is:

1. A method for monitoring ground settlement based on computer vision, comprising the following specific implementation steps:

step A: instrument arrangement step A1: investigating ground conditions of a to-be-measured area, comprehensively considering soil texture and pavement, surrounding roads, vegetation conditions and corresponding monitoring requirements, and selecting appropriate ground monitoring points;

step A2: inserting monitoring targets into a ground at to-be-measured ground monitoring points to ensure that the monitoring targets are firmly installed and free from looseness and inclination, wherein each monitoring target is composed of a top LED lamp, an LED lamp chamber, a rechargeable battery, a small lamp switch and a target rod;

step A3: at an appropriate position on a midperpendicular of a connecting line of the ground monitoring points, arranging an industrial camera and installing a zoom lens, and connecting the industrial camera with a computer by a gigabit Ethernet cable;

step B: device debugging step B1: adjusting a tripod to ensure that the visual field of the industrial camera is in a horizontal position and ensure that the tripod is firmly grounded, and tightening connecting screws;

step B2: facing an open side of the LED lamp chamber to the lens, installing the rechargeable battery, and testing through the LED lamp switch whether the top LED lamp of the target can emit light normally for each top LED lamp; the inner wall of the lamp chamber is treated with black matte paint to reduce the influence of sunlight or other adjacent illumination sources;

step B3: adjusting a focal length and an aperture of the zoom lens, an exposure value and a gain value of the industrial camera to ensure that an image of the top LED lamps in the visual field of the camera is clearly visible;

step C: parameter setting step C1: acquiring a first image frame, circling the top LED lamp as a tracking template in the first image frame, estimating a total amount of possible settlement generated by each ground monitoring point during monitoring, and assigning a monitoring area for each target small lamp;

step C2: measuring a distance between centers of the two target rods, and calculating a proportional relation between a pixel size on the image and a physical size in the real world;

step C3: setting a sampling frequency and a data storage path;

step D: monitoring and result storage step D1: before formal monitoring is started, checking for the last time whether the image of the top LED lamp is clear and whether a camera exposure, gain and storage path are correct;

step D2: starting to monitor and checking by naked eyes whether monitoring results are reasonable and whether there are sawtooth waves or abnormal settlement results that are excessively large or excessively small, and if the monitoring results are incorrect, repeating step D1;

step D3: after the monitoring results are verified to be correct, continuing the monitoring until the end of the monitoring period, and storing the settlement monitoring result; wherein the monitoring process is implemented using a template update matching algorithm, specifically comprising:

Before monitoring starts, the first image frame is captured; for one measuring point, the area of the top LED lamp in the first image frame is circled as a tracking template, the position of the pixel center of the template area is used as the reference point for calculating the settlement of the point, and the monitoring area of this point is circled according to an estimated settlement amount; after monitoring is started, the best match of the top LED lamp template is searched for in the corresponding monitoring area of a second image frame; when the best matched area of the template on the second image is obtained, the position of the pixel center of the best matched area is obtained as the new position of the top LED lamp, and the best matched area is selected as the new template; thus, the pixel displacement between the two adjacent image frames is obtained; and by analogy, multiple pixel displacements of the top LED lamp templates in two adjacent image frames are continuously calculated; the total pixel displacements of the top LED lamps during the monitoring period are calculated through the accumulation of adjacent pixel displacement values, and the actual settlement of the top LED lamps are calculated through the proportional relation between a pixel size on the image and a physical size in the real world.

* * * * *